Sept. 8, 1959     T. F. SARAH     2,903,201
ENCLOSED SPINNING REEL
Filed Oct. 4, 1956     4 Sheets-Sheet 1

INVENTOR.
THOMAS F. SARAH
BY
ATTORNEYS

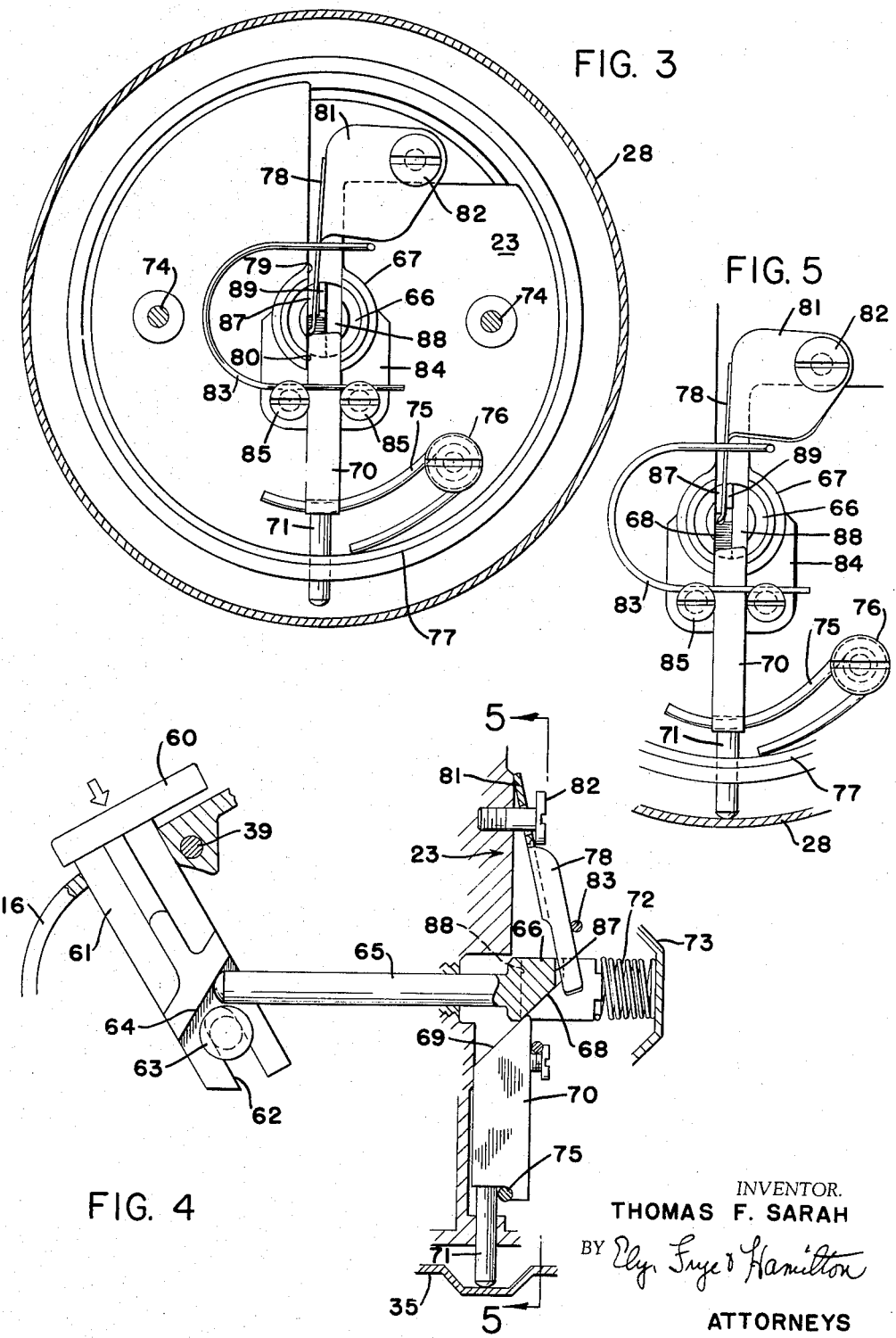

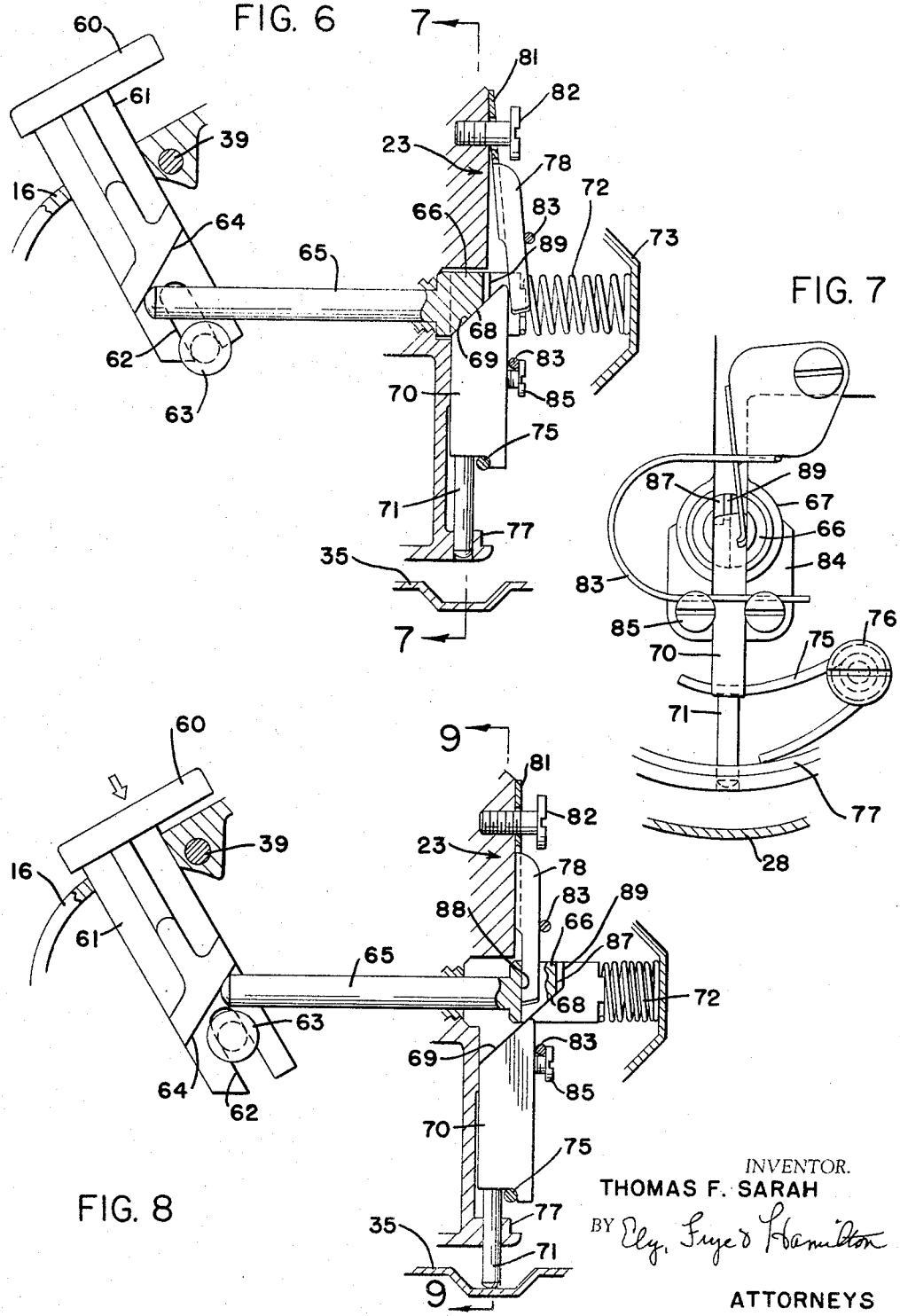

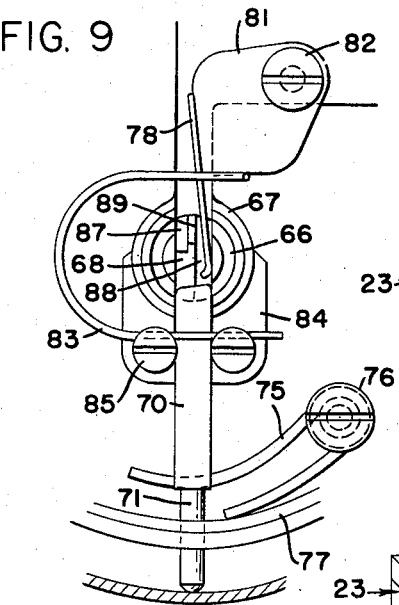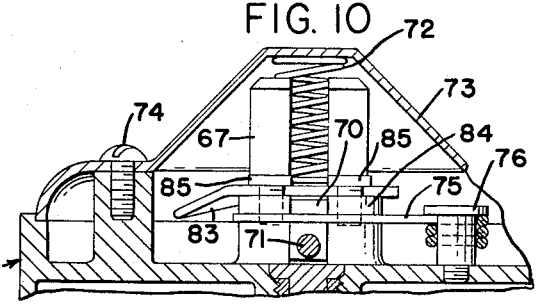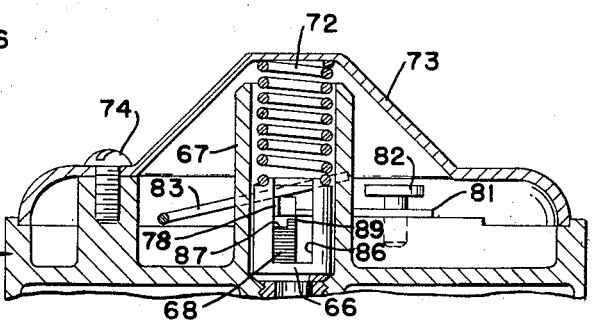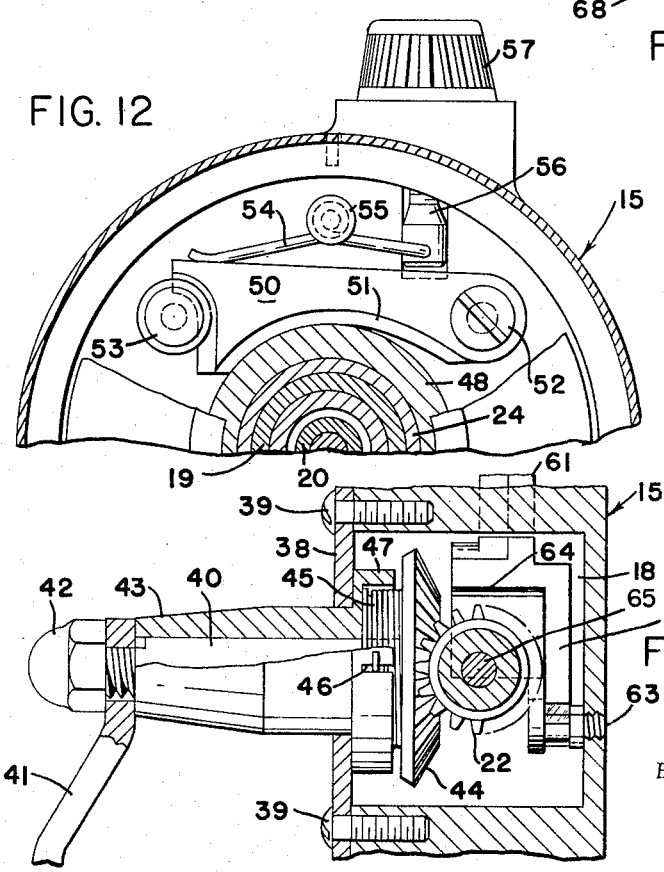

400
United States Patent Office 2,903,201
Patented Sept. 8, 1959

2,903,201

ENCLOSED SPINNING REEL

Thomas F. Sarah, Akron, Ohio, assignor to The Enterprise Manufacturing Company, Akron, Ohio, a corporation of Ohio Application October 4, 1956, Serial No. 613,916

7 Claims. (Cl. 242—84.2)

The invention relates generally to fishing reels of the spinning type, and more particularly to spinning reels in which the line spool is completely enclosed.

In reels of this type, the line spool is ordinarily stationary and rewinding is accomplished by means of a pick-up pin or finger on a flyer rotatable around the spool, said pin guiding the line onto the spool. During casting the pick-up pin is withdrawn or retracted, and means are provided for ejecting the pin at the start of the rewinding operation.

In certain prior devices, the pin is automatically ejected by the initial rewinding movement of the reel, and in such case the line is loose in the interval between the time of casting and the time rewinding is started. The loose line tends to cause snarling on the spool, and also makes it relatively easy for a fish striking the lure to get away before the hook is set. The time interval during which the line is loose is increased when the fisherman is required to change hands on the rod between casting and rewinding. Further, such prior devices required complicated or impractical braking mechanisms for controlling the tension on the line when playing a fish.

An object of the present invention is to provide an improved push button mechanism for ejecting the line pickup pin to catch and hold the line at the end of a cast, so that there is no interval when the line is loose before starting to rewind, even though the fisherman changes hands between casting and rewinding.

Another object is to provide improved mechanism for ejecting and retracting the line pick-up pin by actuating a single push button control.

Another object is to provide improved braking means for the normally stationary spool to control paying out of the line when playing a fish.

A further object is to provide improved clutch means to allow yielding unwinding movement of the winding crank to position the lure prior to casting.

These and other objects are accomplished by the improved reel comprising the present invention, a preferred embodiment of which is shown by way of example in the accompanying drawings and described in detail in the following specification. Various modifications and changes in details of construction are encompassed within the scope of the appended claims.

In the drawings:

Fig. 3 is a cross sectional view on line 3—3 of Fig. 2.

Fig. 4 is a skeleton view similar to Fig. 2, showing the push button pushed in preparing to cast, ejecting the pin still further.

Fig. 5 is a fragmentary transverse view on line 5—5 of Fig. 4.

Fig. 6 is a view similar to Fig. 4, showing the push button released and the pin retracted for casting.

Fig. 7 is a fragmentary transverse view on line 7—7 of Fig. 6.

Fig. 8 is a view similar to Fig. 6, showing the push button again pushed in at the end of a cast.

Fig. 9 is a fragmentary transverse view on line 9—9 of Fig. 8.

Fig. 10 is a fragmentary sectional view taken at right angles to Fig. 2, showing the hub of the flyer in elevation.

Fig. 11 is a similar view showing the hub of the flyer in section.

Fig. 12 is a fragmentary cross sectional view on line 12—12 of Fig. 2.

Fig. 13 is a fragmentary sectional view on line 13—13 of Fig. 2.

Fig. 14 is a detached fragmentary perspective view of the inner end of the plunger shaft which is movably mounted in the hub of the flyer.

Figures 1, 2:
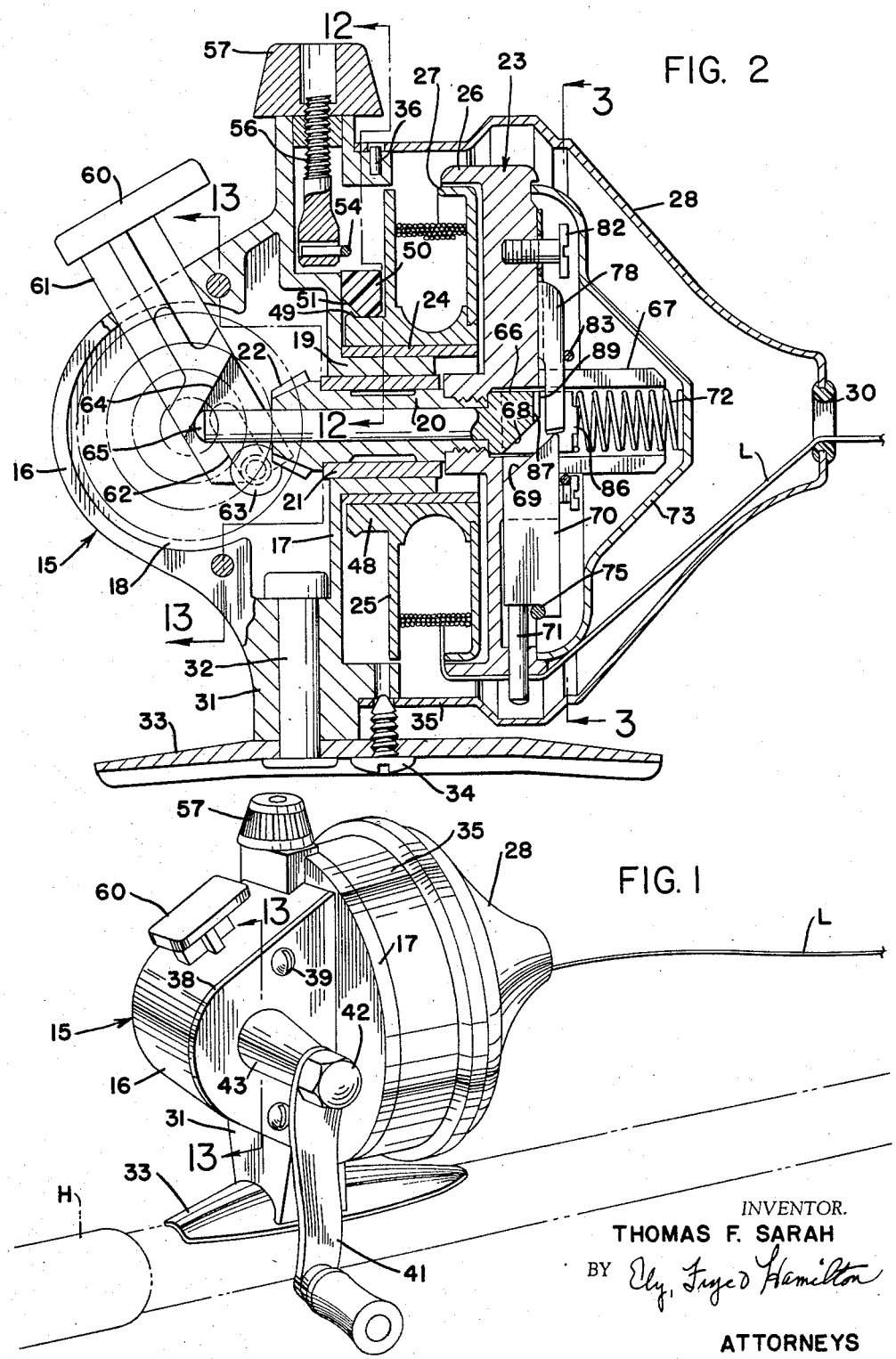
Fig. 1 is a perspective view of a right hand embodiment of the improved reel mounted on a rod.
Fig. 2 is an enlarged sectional view thereof in a plane of the reel axis, showing the pick-up pin ejected and engaging the line.

Referring first to Figs. 1 and 2, the improved reel includes a housing 15 having a rounded rear wall 16 and a substantially circular partition wall 17 forming a gear compartment 18. A hub 19 is formed in the partition wall 17 on the side thereof opposite to the gear compartment, and a tubular shaft 20 is journaled in a bushing 21 secured in said hub. Within the gear compartment a bevel pinion 22 is formed on the end of shaft 20 and its other end is secured in the hub of the flyer disk 23.

A tubular bushing 24 is secured in the line spool 25 and the bushing 24 is rotatively mounted around said hub 19, but the spool is normally held stationary by a friction brake to be described. Preferably, the flyer 23 has a rearwardly extending peripheral flange 26 overhanging the exterior peripheral flange 27 on the spool. Thus, the flyer 23 is rotatable around the spool. A substantially conical cap 28 encloses the spool and flyer and has a line eyelet 30 mounted in its outer end for guiding the line L into and out of the cap. Within the cap the line passes over the periphery of the flyer to the spool, as shown in Fig. 2.

At one side of the gear compartment 18 the housing is provided with a lateral extension 31 which may be attached by a bolt 32 to a bracket 33 for fitting a fishing rod, as shown in Fig. 1. A screw 34 in the bracket may be used to secure the annular peripheral flange 35 of the cap 28 to an annular shoulder on the housing, a dowel pin 36 serving to secure the flange to the shoulder at a point diametrically opposite to the screw 34.

One side of the gear compartment 18 is preferably closed by a plate 38 attached to the housing by screws 39, and the crank shaft 40 to which the crank handle 41 is secured by a nut 42, is journaled in a hub 43 secured in said plate 38 as best shown in Fig. 13. The reel shown in the drawings has its crank handle mounted for right hand rewinding, but the reel can easily be made for left hand operation by locating the plate on the reverse side of the housing. A bevel gear 44 is secured on the inner end of the crank shaft 40 and meshes with the bevel pinion 22 to rotate the flyer shaft 20. A torsion spring clutch is provided to permit free rotation of the crank shaft in a direction to rewind the line and normally prevent rotation in a reverse direction.

The clutch comprises a torsion spring 45 wrapped around the shank of gear 44 and having its outer end secured in a slot 46 in the annular flange 47 of the hub and its inner end free on said shank. The spring is wrapped in the direction so as to unwrap or loosen when the shaft is turned to rewind the line, and so as to tighten around the shank when the shaft is wound in the opposite direction. However, the crank handle may be reversely rotated against the frictional resistance of the tightened spring for the purpose of positioning the lure at a desired distance from the end of the rod prior to making a cast, or for any other reason.

The improved friction brake for controlling the tension on the line when playing a fish is best shown in Figs. 2 and 12. The hub of the spool 25 is provided with a rearwardly extending annular portion 48 having a lip 49 around its outer periphery. A curved shoe 50, preferably of plastic material such as nylon, is yieldably mounted on the housing for frictionally engaging the annular hub portion 48 of the spool. The rear inner edge of the shoe is preferably beveled as shown at 51 to facilitate engaging the shoe behind the lip 49 to retain the spool on the hub 19 of the housing. The rear surface of the shoe is normally in abutment with the partition wall 17 of the housing.

The brake shoe 50 is pivoted at one end on a screw 52 secured in the housing, and a stud 53 in the housing limits radially inward movement of the free end of the arm. A wire spring 54 is looped intermediate its ends around another stud 55 in the housing and one end of the spring urges the shoe into engagement with the hub 48 of the spool. The other end of the wire spring 54 is secured in an adjusting screw 56 extending outwardly through the housing and having an exterior adjusting nut 57 threaded on its outer end. Rotating the nut to move the screw axially away from the shoe increases the spring tension on the free end of the brake shoe. The spool may be pulled off the hub 19 by reversely rotating the nut to decrease the tension on the brake shoe, in which case the stop stud 53 prevents the shoe from swinging too far behind the lip 49.

Accordingly, the improved brake retains the spool from being removed from the hub 19, and also provides convenient and easily accessible adjusting means for controlling the tension on the line when playing a fish by allowing the spool to turn when the tension on the line overcomes the frictional resistance of the brake.

Referring now to the push button mechanism for controlling movement of the pick-up pin, the push button 60 preferably has a shank 61 slidable through the upper side of the housing so that the button 60 is placed under the thumb of the right hand holding the handle H of the casting rod (Fig. 1). Within the gear compartment 18 the inner end of the shank 61 is formed into a yoke 62 which straddles a stop stud 63 (Fig. 13) secured in the housing to limit inward movement of the shank. An inclined cam face 64 on the stem slidably engages the rear end of a plunger shaft 65 which is axially slidable in the flyer shaft 20, so that pressing inwardly on the button 60 moves the plunger shaft 65 forwardly.

The front end of plunger shaft 65 has an enlarged socket portion 66 thereon (Fig. 14) which is movable axially within a tubular hub portion 67 extending forwardly from the flyer disk 23. Formed internally of the socket portion is an inclined cam face 68 slidably engageable with the inclined cam face 69 on the inner end of a radially extending rectangular pin carrier bar 70. The cylindrical pick-up pin 71 on the outer end of bar 70 is extensible through the outer periphery of the flyer, as shown in Fig. 2.

Forward movement of the plunger shaft 65 is yieldingly resisted by a helical spring 72 positioned within the hub 67 and backed up by a substantially conical cap 73 secured to the front face of flyer 23 by screws 74 (Figs. 10 and 11). Radially outward movement of pick-up pin 71 is yieldingly resisted by a wire spring 75 looped around a stud 76 on the face of the flyer and having one end engaging the outer end of bar 70. The other end of spring 75 engages the peripheral flange 77 of the flyer (Fig. 3).

A trip lever arm 78 is provided for cooperating with the socket 66 of the plunger shaft to control movement of the pick-up pin, and the trip lever extends through a slot 79 in the hub 67 diametrically opposite to the slot 80 through which the rectangular carrier bar 70 extends. The outer end of lever arm 78 is connected to an angular flange 81 which is loosely pivoted on the laterally offset pivot screw 82 secured in a boss on the flyer 23. The inner end of the arm 78 is adapted to engage the inner end of carrier bar 70, as shown in Fig. 3, and the inner edge of bar 70 is slightly inclined to cause clockwise rotation of the arm 78 in response to the pressure of spring 75. A wire loop spring 83 has its free end pressing angularly downward on the arm 78 tending to rotate it counterclockwise. The other end of spring 83 is secured to a boss 84 on the flyer by screws 85, the upper surface of the boss spacing the spring from the pin 70 as seen in Fig. 10.

As seen in Fig. 14, the socket portion 66 of the plunger shaft 65 is provided in its outer end with a transverse groove 86 in alignment with the slots 79 and 80 in the hub 67 and adapted to slidably receive the inner end of bar 70 and the inner end of the trip lever 78. The cam face 68 is formed at the inner end of said groove, and adjacent the cam face the bottom of the groove is stepped to form a shallow shoulder 87 and a deep shoulder 88 adjacent thereto, there being a projection 89 between the two shoulders.

In the operation of the improved reel, assume that the parts are in the position of Figs. 2 and 3, and that the line L has been reeled in to position the lure for making a cast. In this position the end of the trip lever 78 is aligned with shoulder 87 and to the left of projection 89 (as viewed in Fig. 3), and the inner edge of the bar 70 is engaging the end of lever 78, holding the end of pin 71 ejected out of the rim of the flyer to engage the line L as it passes over the flyer to the spool 25.

In preparing to cast, the fisherman presses inwardly on the button 60 with his thumb and holds the button in this position until the cast is started at which time he releases the button to release the line. As the button 60 is pressed in the parts assume the positions of Figs. 4 and 5. The plunger 65 moves forwardly compressing spring 72, and the cam surface 68 slides over cam surface 69 to further eject the pin 71 a slight amount against the pressure of spring 75 and shoulder 87 engages the inner end of lever arm 78 and moves it away from the inner edge of the bar. In this position the projection 89 prevents counter clockwise rotation of the arm 78 as urged by spring 83.

When the button 60 is released, the spring 72 forces plunger shaft 65 rearwardly and raises button 60. This allows the inner end of the pin carrier 70 to slide under the trip lever to retract the pin 71 and completely release the line, as seen in Figs. 6 and 7. During the first part of the rearward movement of the plunger, the projection 89 prevents counter clockwise rotation of the arm 78, but as the carrier 70 slides under the arm and holds it away from the projection, the spring 83 rotates the arm over the projection and the carrier bar to the position of Fig. 7, where it is aligned with the deep shoulder 88 of the socket.

The instant the lure strikes the water at the end of the cast, the fisherman again presses button 60 inwardly to again fully eject the pick-up pin 71 and catch and hold the line until rewinding is started. This depression of button 60 forces the carrier bar outwardly from under arm 78 and allows it to drop into the deep part of slot 86 against shoulder 88 in radial alignment with the inner edge of bar 70, as seen in Figs. 8 and 9. The button may now be released to start reeling in the line, and spring 72 moves shaft 65 rearwardly, permitting spring 75 to force the inner edge of bar 70 against the end of lever arm 78. As will be apparent from Fig. 9, pressure of the cam edge of bar 70 against the end of lever arm 78 will cause clockwise rotation of the arm about its offset pivot 82, causing the arm to move to the position of Fig. 3 where it is aligned with the shoulder 87 in readiness for the next cast.

Accordingly, the improved reel provides novel push button means for releasing the line at the start of a cast and for catching and holding the line during the time interval between the cast and the start of the rewinding operation, allowing plenty of time for the fisherman to change hands without the danger of having a loose line when a fish strikes. The push button is in convenient position and the same actuation of the button is used both to release and to hold the line, making the whole casting operation extremely simple and effective.

What is claimed is:

1. In a spinning reel having a normally stationary spool and a flyer rotatably mounted adjacent to the spool, a hollow shaft journaled axially within said spool and secured at its forward end to the flyer, means for rotating said shaft, a line pick-up pin slidable radially in said flyer for ejecting its outer end through the periphery thereof, spring means urging said pin inwardly, a plunger axially slidable in said hollow shaft and having a socket in its forward end, cooperating cam elements on said socket and said pin for radially ejecting said pin by forward movement of said plunger, a trip arm pivoted on said flyer extending into said socket to engage and hold said pick-up pin ejected when said plunger is moved rearwardly, push button means for moving said plunger forwardly, and spring means for urging said plunger rearwardly.

2. In a spinning reel having a normally stationary spool and a flyer rotatably mounted adjacent to the spool, a hollow shaft journaled axially within said spool and secured at its forward end to the flyer, means for rotating said shaft, a line pick-up pin slidable radially in said flyer for ejecting its outer end through the periphery thereof, spring means urging said pin inwardly, a plunger axially slidable in said hollow shaft and having a socket in its forward end, cooperating cam elements on said socket and said pin for radially ejecting said pin by forward movement of siad plunger, a trip arm pivoted on said flyer and extending into said socket to normally engage and hold said pin in ejected position when said plunger is moved rearwardly, said socket having shoulders adapted on successive forward strokes of said plunger to release the trip arm for retracting said pin and to re-engage the arm with said pin to hold it in ejected position, push button means to move said plunger forwardly and spring means to urge said plunger rearwardly.

3. In a spinning reel having a normally stationary spool and a flyer rotatably mounted adjacent to said spool, a plunger slidable axially in said spool and flyer, push button means for moving said plunger forwardly of said flyer, spring means on said flyer for moving said plunger rearwardly, a line pick-up pin radially slidable in said flyer, means operatively connecting said pin and said plunger for ejecting said pin to line pick-up position in response to forward movement of said plunger, a slotted forward end on said plunger, and a trip arm pivoted on said flyer and adapted to move into said slotted end to engage and hold said pin ejected when said plunger moves rearwardly and to engage the plunger and release said pin when the plunger again moves forwardly.

4. In a spinning reel having a normally stationary spool and a flyer rotatably mounted adjacent to said spool, a plunger slidable axially in said spool and flyer, push button means for moving said plunger forwardly of said flyer, spring means on said flyer for moving said plunger rearwardly, a line pick-up pin radially slidable in said flyer, means operatively connecting said pin and said plunger for ejecting said pin to line pick-up position in response to forward movement of said plunger, and a trip arm pivoted on said flyer and adapted to cooperate with said plunger to hold said pin ejected when said plunger moves rearwardly, said plunger having shoulders adapted on successive forward strokes to engage and release the trip arm for retracting said pin and to reengage the pin to hold it ejected.

5. In a spinning reel having a normally stationary spool and a flyer rotatably mounted adjacent to said spool, a line pick-up pin on the flyer extensible radially of its periphery, a manually actuatable plunger shaft at right angles to said pin adapted to extend said pin by axial movement of said plunger shaft, and a trip arm pivoted on the outer end of said flyer and adapted to engage and hold said pin extended during one stroke of the plunger shaft and to engage the plunger shaft and release the pin on the next successive stroke of the plunger shaft.

6. In a spinning reel having a normally stationary spool and a flyer rotatably mounted adajcent to said spool, a line pick-up pin on the flyer extensible radially of its periphery, a manually actuatable plunger shaft at right angles to said pin adapted to extend said pin by axial movement of said plunger shaft, and a trip arm pivoted on said flyer and adapted normally to engage and hold said pin extended, shoulders at different levels on the end of said plunger shaft, and said trip arm cooperating with said shoulders during a forward and return stroke to release said pin and during the next forward and return stroke to reset the pin in extended position.

7. In a spinning reel having a normally stationary spool and a flyer rotatably mounted adjacent to said spool, a line pick-up pin on the flyer extensible radially of its periphery, spring means urging said pin to retracted position, a manually actuatable plunger shaft at right angles to said pin adapted to extend said pin by axial movement on its forward stroke, spring means to return said plunger shaft, shoulders at different levels on the end of said plunger shaft, and trip means on said flyer adapted normally to engage and hold said pin extended, said trip means cooperating with said shoulders during a forward and return stroke to release said pin and during the next forward and return stroke to reset the pin in extended position.

References Cited in the file of this patent

UNITED STATES PATENTS

| | | |
|---|---|---|
| 2,210,080 | Hover et al. | Aug. 6, 1940 |
| 2,508,217 | Brell | May 16, 1950 |
| 2,597,318 | Haase | May 20, 1952 |
| 2,598,846 | Smith et al. | June 3, 1952 |
| 2,613,883 | Limpright | Oct. 14, 1952 |
| 2,652,991 | Murvall | Sept. 22, 1953 |
| 2,667,312 | Denison et al. | Jan. 26, 1954 |
| 2,675,192 | Hull | Apr. 13, 1954 |